(12) United States Patent
Goldner et al.

(10) Patent No.: US 7,840,105 B2
(45) Date of Patent: Nov. 23, 2010

(54) RUGGED FIBER OPTIC TOWED ARRAY

(75) Inventors: Eric Lee Goldner, Valencia, CA (US); Fred Demetz, Upland, CA (US)

(73) Assignee: Sabeus, Inc., Calabasas, CA (US)

( * ) Notice: Subject to any disclaimer, the term of this patent is extended or adjusted under 35 U.S.C. 154(b) by 59 days.

(21) Appl. No.: 12/096,416

(22) PCT Filed: Dec. 11, 2006

(86) PCT No.: PCT/US2006/061813

§ 371 (c)(1),
(2), (4) Date: Nov. 17, 2008

(87) PCT Pub. No.: WO2007/087093

PCT Pub. Date: Aug. 2, 2007

(65) Prior Publication Data

US 2009/0220187 A1 Sep. 3, 2009

Related U.S. Application Data

(60) Provisional application No. 60/748,774, filed on Dec. 9, 2005.

(51) Int. Cl.
*G02B 6/34* (2006.01)

(52) U.S. Cl. ............................ 385/37; 385/12; 385/100; 385/104; 385/134; 385/147; 367/149

(58) Field of Classification Search ................... 385/12, 385/37, 104, 100, 134, 147, 149; 367/149
See application file for complete search history.

(56) References Cited

U.S. PATENT DOCUMENTS

| | | | | |
|---|---|---|---|---|
| 6,211,964 | B1* | 4/2001 | Luscombe et al. | 356/477 |
| 6,466,719 | B2* | 10/2002 | Stottlemyer et al. | 385/104 |
| 6,515,939 | B1* | 2/2003 | Green et al. | 367/149 |
| 6,549,488 | B2* | 4/2003 | Maas et al. | 367/149 |
| 6,728,165 | B1* | 4/2004 | Roscigno et al. | 367/14 |
| 7,369,716 | B2* | 5/2008 | Berg et al. | 385/12 |
| 2004/0202401 | A1 | 10/2004 | Berg et al. | |

OTHER PUBLICATIONS

International Search Report, ISA/US, dated Nov. 26, 2007, pp. 1-3.

* cited by examiner

*Primary Examiner*—Brian M. Healy
*Assistant Examiner*—Guy G Anderson
(74) *Attorney, Agent, or Firm*—John K. Fitzgerald; Fulwider Patton LLP

(57) ABSTRACT

A fiber optic towed array is provided. The array includes a flexible core upon which is disposed a semi-rigid mandrel. The semi-rigid mandrel has a helical groove formed therein, in which is disposed an optical fiber, the optical fiber including a plurality of fiber gratings. The mandrel is in turn covered with a nylon or fiber screen and encased in a layer of open cell foam, which is encased in a protective covering that includes at least one strength member disposed along a longitudinal axis of the array.

15 Claims, 4 Drawing Sheets

RUGGED FIBER OPTIC TOWED ARRAY

RELATED APPLICATIONS

This is a U.S. national phase application of PCT/US2006/061813, filed Dec. 8, 2006, which claims priority from Provisional Application No. 60/748,774 filed Dec. 9, 2005.

BACKGROUND OF THE INVENTION

Fiber optic towed arrays are commonly constructed of a series of sensors interconnected along and within a common hose or casing. The sensors are typically comprised of buffered (with thin, approximately 40-50 micron thick plastic coating) optical fiber precision wound with adhesives on concentric, rigid tubes or mandrels. In some cases, the outer tubes are surrounded by rigid, perforated, cylindrical 'cages'.

The mandrels upon which the fiber is wound are typically rigid with an air backing to allow sufficient compliance of the structure so that the fiber can respond to applied acoustic pressure signals, yet not collapse at operating water depths. Since the completed towed array must be reeled onto a drum for storage, it must be relatively flexible. This requirement for flexibility limits the length of the individual rigid mandrels to not more than a few inches, thus a flexible link between the hundreds of rigid mandrels is required. The optical sensing fiber must be wound over this flexible link as well. The fiber wound around the tubes is interconnected by buffered fiber that is wound along flexible cylindrical links between the mandrels. Winding the optical fiber at a very closely controlled tension and pitch, while at the same time applying adhesive, over rigid mandrels and flexible links requires expensive and precise manufacturing equipment.

Two significant problems are associated with the current state-of-the-art fiber optic towed arrays. They are expensive to produce due to the high level of manual labor needed to fabricate the sensors and assemble the arrays. They also suffer from reliability during handling operations. Failures of the optical fibers within the array are caused by fiber abrasion and microbending at rigid-flexible structure interfaces and by crushing when exposed to radial compression while wound on a handling reel.

What has been needed is rugged fiber optic towed array that can be easily and relatively inexpensively manufactured that provides excellent acoustic properties and offering increased protection to the fiber optic to prevent damage to the fiber optic during towing and spooling during deployment and recovery. The present invention satisfies these and other needs.

SUMMARY OF THE INVENTION

The present invention provides a rugged fiber optic towed array suitable for use in harsh environments, such as below the surface of a body of water. In various aspects, arrays in accordance with the principles of the present invention provide a rugged towed array that is relatively inexpensive to produce, yet which provides an array that is resistant to breakage while being towed, resistant to crushing or other damage during spooling while being deployed or retrieved, yet provides for excellent acoustic properties and sensitivity.

In one aspect, the present invention comprises a towed array comprising a flexible core, a mandrel having a helical groove formed therein surrounding the core, and an optical fiber having a plurality of fiber Bragg gratings formed therein disposed within the helical groove of the mandrel. In one aspect, the flexible core is formed of a voided polymeric material. In another aspect, the polymeric material is polyurethane.

In still another aspect, the array includes a layer of open cell foam surrounding the mandrel. In another aspect, the mandrel is covered with a tough fiber screen or mesh to prevent direct contact between the open cell foam and the optical fiber.

In yet another aspect, the array also includes at least one strength member disposed along a longitudinal axis of the array. In still another aspect, the strength member is formed from Vectran or Kevlar. In a further aspect, the array also includes a protective covering encasing the core, mandrel, layer of open cell foam and at least one strength member.

In a still further aspect, the mandrel may include helixed sections located at desired periodicity along the mandrel to provide attenuation and isolation of longitudinal vibrations which might otherwise propagate along the array increasing the acoustic self noise of the array. The helixed sections also provide for transverse flexibility in the array when it is spooled. The helixed sections may also be grooved to allow for a protected, uniform and continuous distribution of the optical fiber along the mandrel.

In yet another aspect, the array provides a sensor having uniform response to acoustic signals along its entire length. In still another aspect, the sensor has a minimum response to flow noise.

Other features and advantages of the invention will become apparent from the following detailed description, taken in conjunction with the accompanying drawings, which illustrate, by way of example, the features of the invention.

DETAILED DESCRIPTION OF THE PREFERRED EMBODIMENTS

Figure 1:
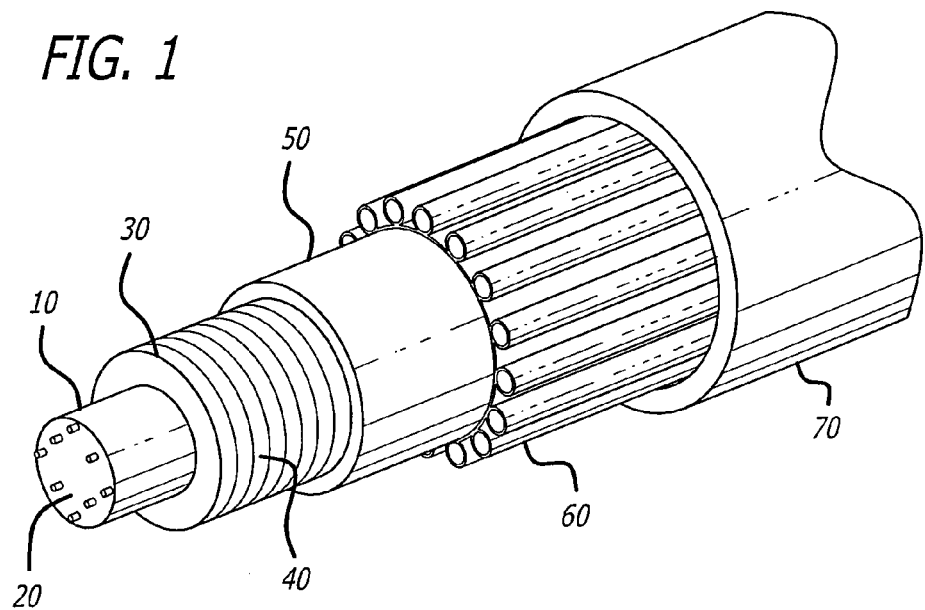
FIG. 1 is a prospective view, partially cut-away, of an embodiment of a rugged fiber optic towed array in accordance with the principles of the present invention.

While several particular forms of the invention have been illustrated and described, it will be apparent that various modifications can be made without departing from the spirit and scope of the invention. In a preferred embodiment, as depicted in the exemplary drawing of FIG. 1, the construction includes a central flexible core 10, within which pass-through fibers 20. Through fibers are defined as fibers that are not used for sensing in a given acoustic module, and are either helically wound within the flexible core or passed through the center of the flexible core. Fiber Bragg Grating (FBG) arrays (not shown) can also be helically wound within the core for measuring the shape of the array. The core is constructed with the fiber wound around a core layer of voided plastic, such as polyurethane or other appropriate polymers, then overcoated with the same material for protection. Use of the voided plastic helps to ensure neutral buoyancy of the array, while avoiding the use of environmentally harmful low buoyancy fill fluids. The neutral buoyancy provided by the core is particularly advantages in that neutrally buoyant arrays remain horizontal in the sea when towed and thereby provide for proper orientation of the array sensors for the acoustic detection of sound sources.

The central core 10 is disposed within a mandrel 30 that is comprised of semi-rigid or a series of rigid and semi-rigid sections to provide for flexibility and strength as well as crush resistance. Around the mandrels 30 is a layer of open cell foam 50 that serves to provide acoustic standoff to isolate the sensor from vibratory input that may exist at the hose or strength member. Around the foam is a layer of nylon cloth 60, to which is attached longitudinal strength members, such as, for example, Vectran or Kevlar. Surrounding the entire assembly is an outer plastic sheath or coating 70.

This construction of the array helps minimize the wave speed in the core, thereby minimizing coherent noise traveling along the array under towed conditions. All of the longitudinal strain load is carried by the strength members, and the core/mandrel sub-assembly is isolated from this strain.

Inclusion of the FBG sensor or hydrophone fiber in the array is simplified by the helical structure of the mandrels 30. The helical groove 40 within the mandrels protects the fiber (not shown, since it is wound within the groove 40) from crushing and damage caused by bending or tensile strain conditions. Assembly of the array is very easily automated by winding the optical fiber sensor within the helical groove using non-precision winding equipment. The groove of the mandrels is also advantageous in that it automatically aligns the fiber within the groove.

The construction of a presently preferred rugged fiber optic towed array in accordance with the principles of the present invention will not now be discussed in more detail. As shown in FIG. 1, the central core 10 consists of a flexible extruded cylinder of voided polyurethane, which may be, for example, slightly over ½ inch in diameter. The voided content of the extruded cylinder will typically be adjusted as needed to obtain neutral buoyancy. Shape measurement and pass through optical fibers 20 are helixed around this central core with a sufficient lay angle to allow a 1.25 foot bend radius for the full-up array, and to limit strain of the optical fibers during all expected drag (tension) loads. The shape measurement fibers 20 have FBGs written into them, the pass through fibers do not have FBGs. Each of these single mode (125/250 μm), low bend loss optical fibers is overcoated with a tight nylon buffer to a diameter of approximately 600 μm for additional strength and durability.

The central core 10 is disposed with a sub-assembly of mandrel to which the optical fiber sensor array is bonded. The optical fiber is typically coated with a suitable voided plastic, such as, for example, a polyurethane, to a diameter of 2-4 mm to ensure high acoustic sensitivity. Such coatings have been found to amplify the pressure induced phase changes in the light transmitted within the optical fiber.

The mandrels are typically formed from tough polycarbonate tubing sections. Each of the sections as can be seen in FIG. 1, have lands and grooves, similar to a lead screw. The sections may be bonded to the outer surface of the central core 10. While the use of polycarbonate is presently preferred, the semi-rigid mandrels may be formed from any suitable plastic using various methods known in the art. Such methods are typically low cost, allowing the formation of mandrels having helical grooves disposed along their length without requiring expensive tooling or manufacturing processes The structure of the polycarbonate mandrels performs several functions. First, the grooves assist in positioning the coated fiber sensors at appropriate locations along the towed array to optimize sensitivity of the array. Second, the mandrels protect the helixed shape measurement and pass-through fibers 20 disposed within the central core 10. Finally, the mandrels provide for segmentation of the hydrophones making up the sensor array. The segmentation of the array reduces the effective modulus of the array, hence minimizing the propagation of vibration along the core.

The grooves 40 of the mandrels 30 are "threaded" to the proper pitch based upon the desired sensor frequency of the array, that is, whether the frequency desired is high, medium or low frequency. Once the coated fiber of the sensor array is placed within the grooves 40, the height of the "lead screw" lands protects the fiber from damage during reeling under tension or from crushing loads. This is particularly advantageous in that the lands of the grooves provide the same protection as the circular spacers used in traditional towed arrays and seismic streamers, without any of the noise generating drawbacks of those circular spacers.

Figure 2:
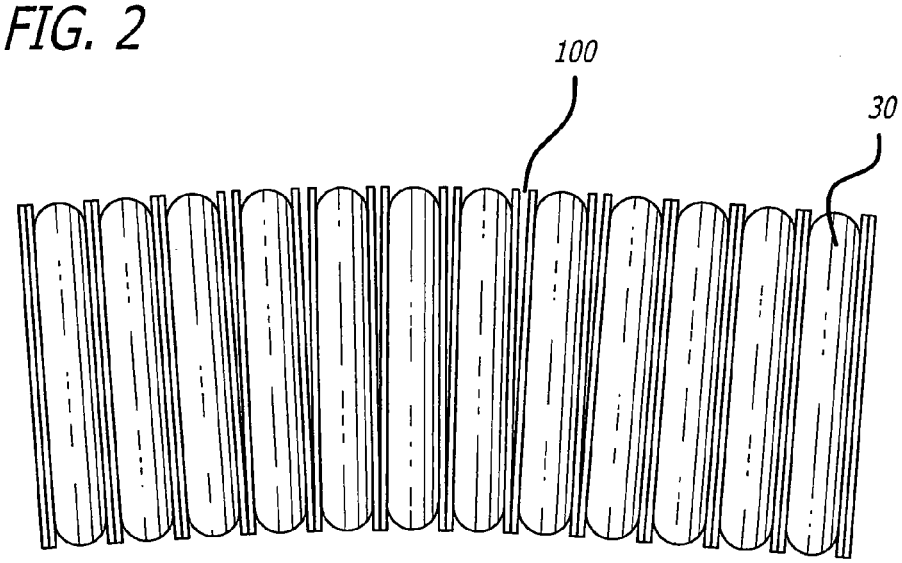
FIG. 2 is a top view of a section of the fiber optic towed array of FIG. 1.

As shown in FIG. 2, in one embodiment, spiral cuts 100 are made through the "lead screw" lands of the mandrel 30 approximately every four inches to allow hydrophone flexibility and break up the vibration path within the core while still protecting the sensor fiber within the mounting channels. After such cuts are made, the mandrel becomes somewhat flexible in that stiff mandrel sections are separated by the spiral cuts, allowing the mandrel to flex in the area of the spiral cuts. Alternatively, stiff rigid mandrels may be separated by flexible regions of mandrels. Typically, either embodiment provides rigid lengths of mandrel on the order of approximately four inches long separated by flexible regions approximately one inch long. A typical length for an entire mandrel assembly will be approximately three hundred feet, although the assembly may be longer or shorter as required by the needs of the application.

Figure 5:
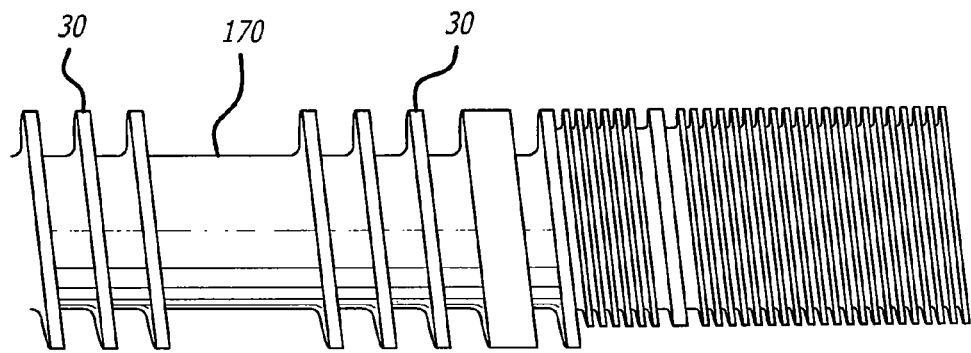
FIG. 5 is a side view illustrating how relatively short sections of mandrel may be easily assembled to form longer structures.

Referring now to FIG. 5, it can be seen that the mandrels 30 may be formed in short sections using low cost machining or molding techniques well known in the art. Such short sections may then be assembled to form longer structures. As discussed above, the mandrels may be rigid, semi-rigid, or flexible, or may be modified to provide the desired rigidity or flexibility as needed. The sections may be easily snapped together by aligning pins 170 which are generally molded into the mandrel section. The aligning pins ensure that the completed mandrel assembly has a continuously smooth helical groove into which the optical fiber sensor is wound.

Once all of the mandrels are assembled, the completed constant diameter acoustic module (CAS) is typically enclosed within a ⅛-inch thick layer 50 of open cell foam which is bonded to the inner diameter of a tubular "sock" or sheath 60. One embodiment of the tubular sock or sheath 60 in accordance with the present invention is shown in FIG. 3.

Figure 3A:
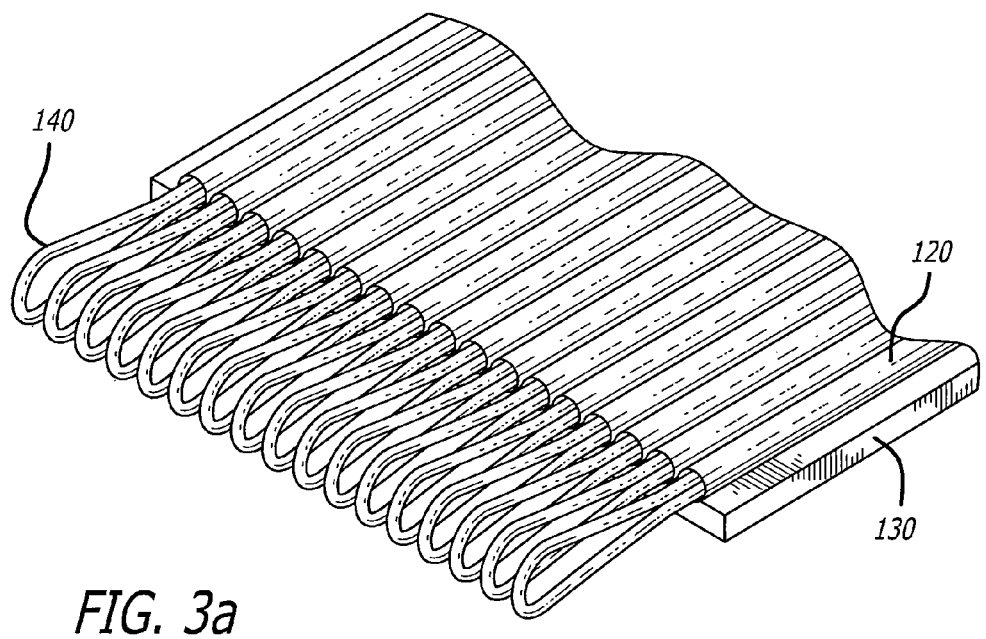
FIG. 3 is a view of the fiber optic towed array in accordance with the principles of the present invention including a blow-up of the end structures of a portion of the array.
Figure 3B:
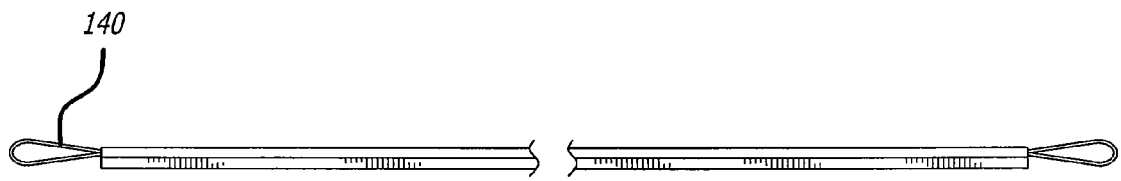

FIG. 3 shows the sock or sheath 60 in a flattened state before it is wrapped around the mandrel assembly. As shown in this embodiment, the woven sock or sheath 60 contains, for example, 16 Vectran strength members 120. The strength members 120 and sock are bonded to the closed cell foam layer 130. This arrangement provides sufficient strength to survive tow speeds up to 35 knots with a 2× margin of safety. For example, predicted strain on the array at 35 knots is 0.5%, and only about 0.1% at the highest operational tow speeds.

More or less strength members may be used depending on the strength requirements of the array.

Each Vectran strength member terminates into a woven eyelet 140, which is looped around a load-bearing pin (not shown) at the acoustic module couplings. Vectran rope is unique in that it can be looped around a pin of an equivalent diameter to its own and maintain 100% of its un-looped strength.

Referring again to FIG. 1, once the hydrophone assembly has been enclosed inside the woven sock 60, it is booted within the outer hose or sheath 70. The outer hose or sheath 70 provides protection to the array, particularly during deployment or retrieval. The hose or sheath 70 is typically made from a material that provides protection against mechanical insult, but is still flexible enough to allow the towed array to be spooled.

Figure 4A:
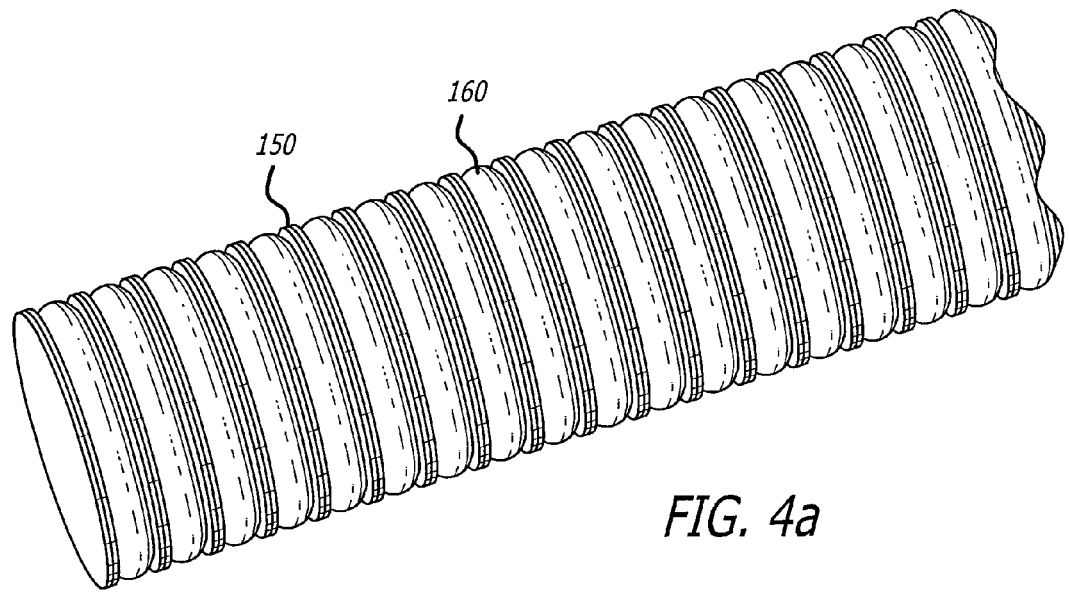
FIG. 4a is a perspective view of a rugged fiber optic towed array assembly showing the mandrel covered with a protective screen.
Figure 4B:
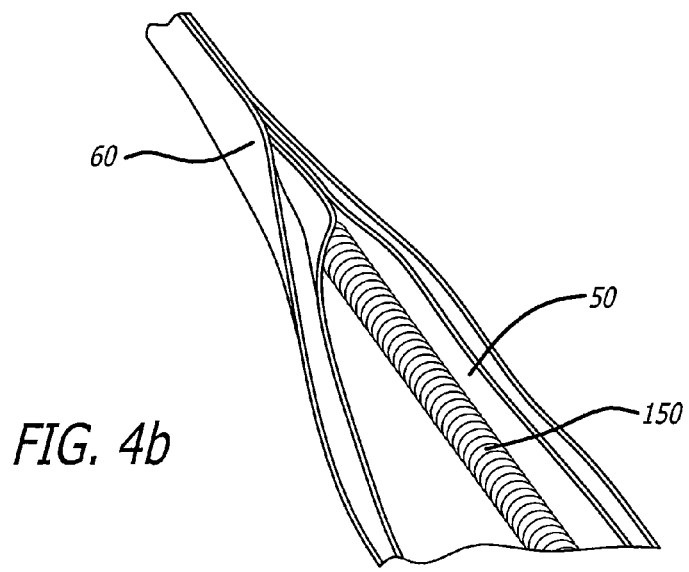
FIG. 4b is a perspective view, partially in cut-away, illustrating the array mandrel including open cell foam and protective covering.

FIG. 4 illustrates another embodiment of the present invention. In this embodiment, the mandrel assembly 150 is surrounded by a protective cloth screen 160. This protective screen provides isolation between the foam layer 50 (FIG. 1) and the optical fiber located within the helical groove of the mandrel.

FIG. 5 illustrates how the screen covered mandrel assembly of FIG. 4 is disposed within the cloth sheath 60 and foam layer 50 of the array. As shown in this FIG., the cloth screen 50 separates the mandrels 30 from the foam layer 60.

Figure 6:
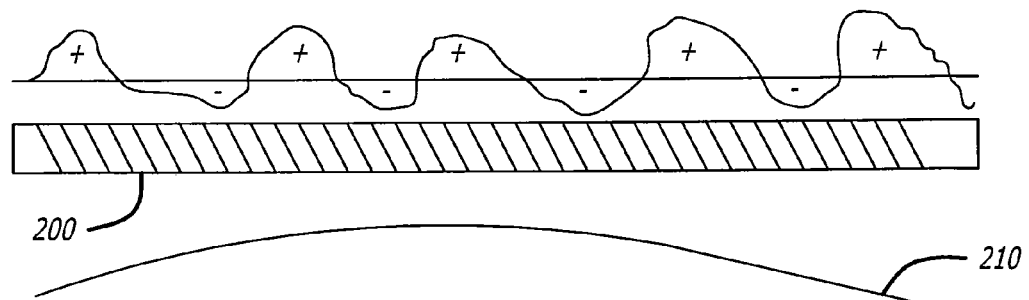
FIG. 6 is a graph depicting an extended sensor effect provided by the extended length of the sensor array provided by various embodiments of the present invention.

FIG. 6 is a graph showing how the unique construction of a sensor array in accordance with principles of the present invention results in an array which uniformly senses pressure along its length. As shown, the sensor array and mandrel assembly 200 detects the presence of an acoustic signal 210. In contrast to the finite length periodic optical sensors used in currently available fiber optic array employing a series of air-backed cylinders upon which is wound the detecting fiber, the extended sensor of the present invention provides an extended sensor effect which results in the pressure of the acoustic wave being sensed uniformly along the extended length of the sensor. With the arrangement described above, short wavelength flow noise sources are canceled out over the length of the continuous sensing array. Additionally, long wavelengths of the acoustic signal are summed coherently over the continuous sensing length of the array. This enhances the signal-to-noise ratio of the array, improving sensitivity of the array to faint noise sources while significantly reducing the effect of noise sources due to flow of the array through water, as well as other short wavelength noise sources.

While several particular forms of the invention have been illustrated and described, it will be apparent that various modifications can be made without departing from the spirit and scope of the invention.

We claim:

1. A towed array, comprising:
   a flexible core;
   a mandrel surrounding the core, the mandrel having a plurality of sections, each section having a length and also having at least two helical lead screw lands with a groove disposed therebetween, and a spiral cut disposed in selected lead screw lands within a section to provide additional flexibility to the mandrel, each spiral cut having a length that is less than the length of the section;
   an optical fiber having a plurality of fiber Bragg gratings formed therein disposed within the groove between the helical lead screw lands of the mandrel.

2. The array of claim 1, wherein the flexible core is formed of a voided polymeric material.

3. The array of claim 2, wherein the polymeric material is polyurethane.

4. The array of claim 1, further comprising:
   a layer of open cell foam surrounding the mandrel.

5. The array of claim 4, further comprising at least one strength member disposed along a longitudinal axis of the array.

6. The array of claim 5, further comprising a protective covering encasing the core, the plurality of sections of the mandrel, the layer of open cell foam and at least one strength member.

7. The array of claim 4, further comprising a protective screen disposed between the layer of open cell foam and the mandrel.

8. The array of claim 6, wherein the array is a sensor having a uniform response to acoustic signals along its length.

9. The array of claim 7, wherein the sensor has a minimum response to flow noise.

10. The array of claim 1, wherein the groove, disposed between at least two helical lead screw lands of each section, is threaded to a proper pitch based upon a desired sensor frequency of the array.

11. The array of claim 1, wherein each of the plurality of sections is attached to an adjacent section by an aligning pin.

12. The array of claim 11, wherein the aligning pin is molded into the section.

13. The array of claim 4, wherein the mandrel and the at least one strength member is surrounded by a sheath.

14. The array of claim 13, wherein the sheath is attached to a closed cell foam layer.

15. The array of claim 5, wherein the at least one strength member terminates into a woven eyelet which is disposed about a load-bearing pin.

\* \* \* \* \*